Figure 1:
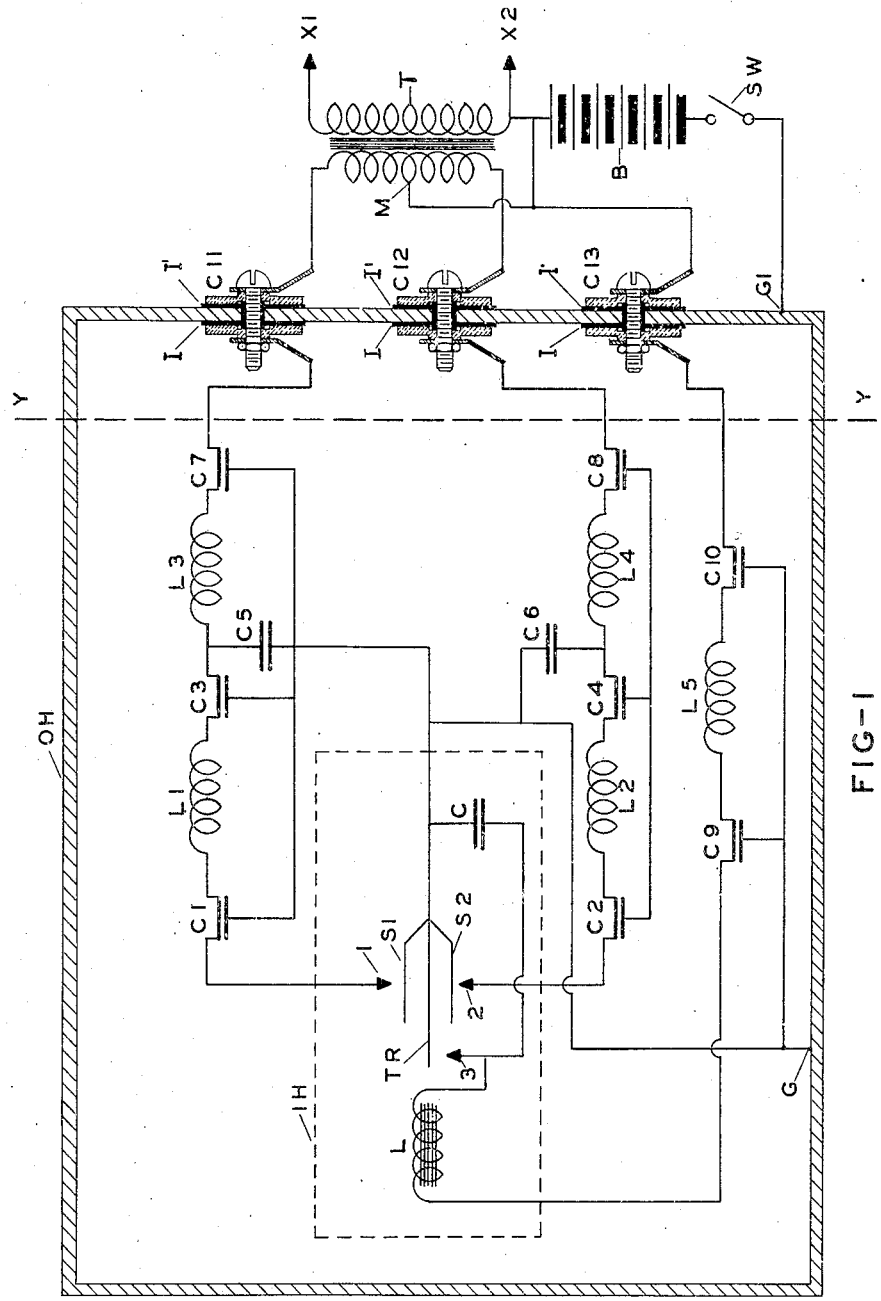

July 19, 1949.                    E. A. TUBBS                    2,476,931
                VIBRATORY DIRECT CURRENT TO ALTERNATING
                              CURRENT CONVERTER
Filed July 28, 1944                                        2 Sheets-Sheet 1

ERNEST A. TUBBS
INVENTOR

BY

ATTORNEY

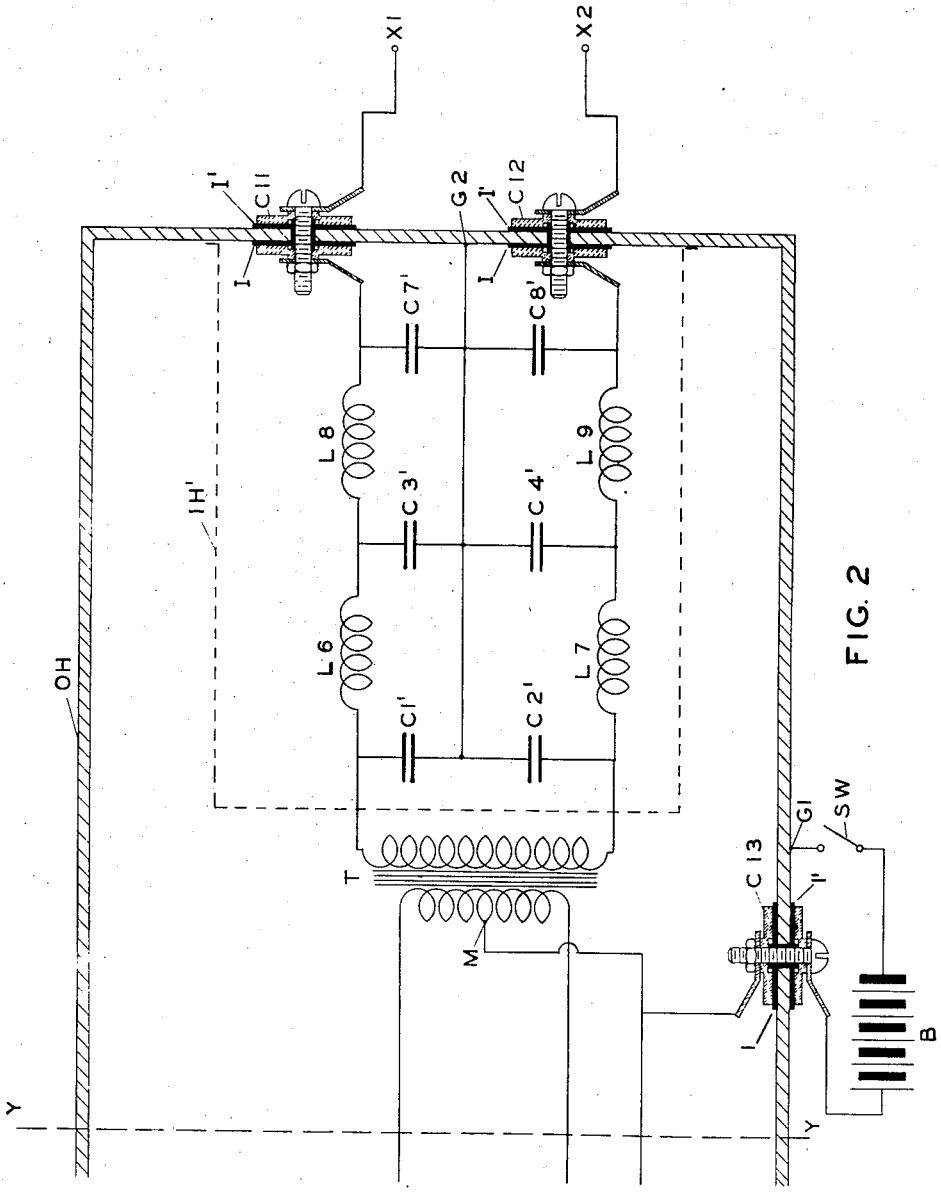

Patented July 19, 1949

2,476,931

UNITED STATES PATENT OFFICE 2,476,931

VIBRATORY DIRECT CURRENT TO ALTERNATING CURRENT CONVERTER

Ernest A. Tubbs, Woodside, N. Y., assignor to Ferris Instrument Laboratories, Boonton, N. J., a corporation of New Jersey Application July 28, 1944, Serial No. 547,059

2 Claims. (Cl. 175—365)

My present invention broadly relates to conversion of one form of electrical energy into another form, and as such it is a continuation-in-part of an application for Letters Patent of the United States filed by me on April 1, 1942, given Serial No. 437,157, which I subsequently abandoned without prejudice to this application.

An object of my present invention is the one of converting the electrical energy of a portable source of the same into the other form to meet the ever-increasing need for operating electrical devices and/or apparatus at points at which no established suitable source of a needed form of electrical energy is available.

Another object of my present invention is the one of converting electrical direct current energy into electrical alternating current energy from a portable source of the former, such as a storage battery, by bringing to bear means requiring relatively small space and weight so as to keep the matter of portability within desired limits without sacrificing the quality and/or perfection of the electrical alternating current resulting from the particular conversion.

A very particular object of my present invention is the one of effectively keeping spurious electrical fields that the particular conversion can and does create out of surrounding regions in which their presence would be intolerable and consequently most seriously detrimental to the uses contemplated. Although I particularly have in mind the existing critical need for my present invention in the many very important cases of using so-called standard signal generators in field work, no implication of limitations of uses in general is thereby intended and/or anticipated.

Having set forth briefly the principal objects of my present invention, it is believed that other objects and/or advantages inherent therein will be readily apparent to those more or less skilled in the particular art after following my descriptive references to the pertinent parts and their respective pertinent functions displayed in and by the two figures of the accompanying drawings here to follow in which Fig. 1 displays a preferred form of my present invention and Fig. 2 displays certain modifications that can be applied to a portion of Fig. 1 without departing from the spirit of my present invention. In the figures, like symbols represent physically equivalent or functionally equivalent parts and/or elements.

Referring to Fig. 1, a source of electrical energy for conversion is displayed by an indicated battery B having its indicated positive side or end conductively connected to a point M of an indicated primary winding of an indicated transformer T, which point M in most cases should preferably be substantially the mid point of the indicated primary winding. Although the indicated transformer is displayed in two-winding form, it is clearly understandable that it can be replaced by a single winding without departing from the spirit of my present invention. It is also clear that the closure of the indicated switch SW will cause an electrical direct current flow to point M, and thence in reverse directions through the upper and lower portions respectively of the transformer T winding to finally and simultaneously reach the respectively indicated contact points 1 and 2 through the indicated respective filtering elements C1, L1, C3, L3, C7 and C11 in the case of contact point 1 and C2, L2, C4, L4, C8 and C12 in the case of contact point 2 to thereby respectively establish on the said points direct current voltages or potentials.

Element TR indicates a pivoted vibratory reed-like element, selected to have a desired natural period of vibration such as one for producing an electrical alternating current of the usual 60 cycles, projecting into a makable magnetic field of indicated inductance L which, when actively energized on the closure of switch SW through the displayed connection containing the indicated filtering elements C9, L5, C10 and C13, causes the reed-like element TR to take up and continue vibration to alternately cause the clip or spring elements S1 and S2 attached thereto to make and break contacts with contact points 1 and 2, respectively, to alternately cause direct current flow through the displayed connections of the elements S1 and S2 to the common ground G and in opposite directions through the upper and lower portions of the transformer winding containing the point M, to thereby develop electrical alternating potentials across the indicated output terminals X1 and X2.

With switch SW open, the reed-like element is normally maintained in contact with indicated contact point 3 which thereby completes the battery circuit through inductance L to ground G, and by the action of the thus created magnetic field on the closure of switch SW, vibration of the reed-like element TR is started and maintained by its repeated make and break contacts during operation with contact point 3. Unavoidably, make and break sparking, the intensity of which depends somewhat on the potential of battery B, takes place between contact point 3 and the reed-like element TR during operation, and capacitance C in the location displayed tends to lessen the intensity involved and the automatically resulting spurious electrical fields.

Due to the additional sparking that unavoidably takes place between contact points 1 and 2 and clips S1 and S2 during operation, the intensity of which also depends somewhat on the potential of battery B, a very serious added amount of automatically resulting spurious electrical fields is thereby created. Due to the usual very small physical proportions of the elements associated with the sparkings thus plurally created in converters of the kind being dealt with, the frequencies of the spurious resulting electrical alternating fields become very high and even high enough to be termed ultra high.

My analyses of converter arrangements such as herein described establish that the high and/or ultra high frequency energy containing spurious electrical alternating fields common to them are principally developed in the spark gaps and the conductors closely associated therewith that accordingly radiate the fields involved principally from this more or less central location; which finding clearly precludes any possibility of effectively keeping said fields from being intercepted and/or picked up by the output connections of the transformer T by merely including in the lines connecting the contact points 1 and 2 to the point M of the transformer the typical so-called filtering means, as heretofore relied upon by the prior art known, as it is obvious that everything that becomes charged with the energies of said spurious high and ultra high electrical alternating fields will reradiate some of the energy thus collected to everything not screened therefrom.

Of course, some reduction of the extent to which the output connections of a transformer is charged by the spurious electrical alternating current energy involved can be attained by the usual filtering process simply because some of the energy involved is thereby drained off before reaching those portions of the conductors nearest to the transformer and its output connections. To accomplish the most by this common filtering practice along with taking other steps with the same end in view, I employ as filtering condensers those having as low inherent inductance components as reasonably possible, which I indicate by showing the conducting plates of the condensers involved as thicker and therefore more massive and consequently less productive of inductive reactance than the other plates by employing for them heavier than usual drawing indications, which type of condensers I term "feed-along." The indicated condensers C5 and C6 are selected to have capacitance values suitable as timing capacitances for perfecting the wave form of the resulting desired electrical alternating current.

The very fact that said so-called choke coils L1, L2, etc., are used to reactively impede and/or lessen conductive as distinguished from through space energy transfers to the essential transformer of the spurious very high and/or ultra high frequency electrical alternating current energy effects unavoidably means that said coils are consequently caused to effectively take on charges of said energies representative in potentials that cause radiation of energy of the extents to which said reactions of said coils impede conductive energy transfers therethrough to thereby make radiations therefrom through space to said transformer and/or its essential leads of the effects of said space transfers of energies all the more effective; so that if such charged elements are not effectively screened and/or isolated from said transformer and essential leads, they most effectively serve to keep both of the latter charged with the energies of said spurious field effects to undesired for my purpose most effective extents.

To effectively wipe out the unwanted effects of such intolerable faulty filtering, I have found it absolutely necessary to either shield or screen the transformer and its output connections at least from all of the consequential sources of unwanted energy radiation or to at least filter the output connections separately plus shielding them and their filtering elements from all of the consequentially radiating elements, of which two expediencies the first mentioned is preferred.

In carrying out said preferred practice, I undertake to house as perfectly as physically possible all of the consequential radiators of the spurious electrical alternating current energies in an effective metal housing, preferably one having the high electrical conductivity of aluminum, as indicated by the element OH, to effectively shield or screen their potential radiating activities from a transformer and its leads located outside of the said housing.

Where it is necessary to have one or more holes in housing OH to accommodate inside-to-outside, or vice versa, lead-through conductors, it is also quite helpful to my purpose to take effective steps to prevent as much as possible any component of the spurious electrical alternating current energies collected by the inside portions of the said lead-through conductors from escaping through the said holes. In the case of each of the three holes necessary to my present disclosure, as displayed by the elements marked by the symbols C11, C12 and C13, the spurious energies involved collected by the inside leads thereto find at each of the openings a relatively large conductive disc surrounding the same in which to quite freely spread out and from which to quite freely escape into the inviting high conductivity of housing OH through the indicated quite widely spread dielectric I interposed between the disc and housing walls which is preferably made up in the form of a very thin disc of mica, all due to a large extent to the activities being of very high and/or possibly ultra high frequency form. The details for accomplishing this particular result are more fully set forth and described in my co-pending application Serial No. 566,801 filed December 6, 1944, as a continuation-in-part of my application Serial No. 437,158 filed April 1, 1942, now abandoned.

Even though I have taken the usual precaution of completely isolating the spark producing vibrator and its closely associated conductive elements from other elements within the housing OH as far as metallically housing the former is concerned by enclosing them in the indicated inner housing IH, for which I preferably use aluminum, I have found that it still remains fatal to my purpose to place the transformer T within the housing OH whether or not the transformer be of either a two-winding or a single-winding type because I have found that even with all other things being equal the interceptable and measurable spurious electrical alternating current energies in the neighborhood of my terminals X1 and X2 from an inside transformer exceed those from my outside transformer by nothing less than ten to one in intensities, which finding technologically establishes that the matter of inside or outside location of the transformer required is not a mere matter of a builder's or user's choice as the case may be.

Referring to the lines YY in Figs. 1 and 2, they are used to indicate that all things appearing to the left of the line YY of Fig. 1 belong to the left of the same line of Fig. 2 as far as illustration for descriptive purposes is concerned.

Referring specifically to Fig. 2, it principally differs from Fig. 1 in displaying that the one and only transformer T is by way of modification placed inside of the housing OH. In making this choice, I have found that in order to keep the intensities of the spurious electrical alternating current energies interceptable and measurable in the neighborhood of my terminals X1 and X2 to below the ten to one disparity pointed out in connection with the Fig. 1 arrangement the inside portions of the transformer output connections to these terminals have to be not only filtered as indicated by the additional choke coils L6, L7, L8 and L9 plus the additional condensers C1', C2', C3', C4', C7' and C8' and their grounding to the housing OH as indicated by the connection to point G2 but, to obtain any comparable results, I have found that they also have to be effectively screened or shielded from the many other things within the housing OH by the indicated additional inner housing IH' which, like the other two housings, should preferably be of aluminum throughout. To conserve material, the right end of the inner housing IH' is indicated as being completed by being made integral with a portion of the housing OH; and since the functioning of the arrangement of Fig. 2 is necessarily otherwise the same as that of Fig. 1, to again state the same would merely amount to unnecessary repetition.

As to the greater utility of my present invention represented by Fig. 1 in particular, with it I have substantially eliminated all practical evidence of spurious high and ultra high frequency electrical alternating current energies in the neighborhood of my terminals X1 and X2 even in the case of the current passing through the contact points 1 and 2 being as high as 25 amperes.

While I have described my present invention in certain confined respects, it is apparent that modifications may be made and that no limitations are intended other than those imposed by the scope of the appended claims.

What I claim as new, and desire to secure by Letters Patent of the United States is as follows:

1. Apparatus for converting direct current energy into alternating current energy comprising a source of direct current energy; a transformer having primary and secondary windings, said primary winding having a center tap terminal and a pair of outer terminals equally spaced on opposite sides of said center tap terminal and said secondary winding having a pair of output terminals; a vibrator having a pair of fixed contacts and a movable contact, said source being connected between said movable contact and said center tap terminal; balanced combined conductive and filtering means connecting said fixed contacts to said two outer primary winding terminals; means coupled to said source for actuating said vibrator to cause said movable contact to be connected periodically and alternately to said two fixed contacts thereby causing periodically reversing direct current flow through said primary winding together with the creation at said vibrator and conductive and filtering means of unavoidable spurious alternating current effects at frequencies up to and including ultrahigh frequencies, which spurious effects if conducted to or radiated to said transformer are harmful to the operation of said apparatus; a first conductive housing enclosing said vibrator and its contacts and serving partially to shield said transformer from said spurious electrical effects; and a further conductive housing enclosing said first housing and all said conductive and filtering means, but excluding said transformer and source, whereby said transformer is substantially completed shielded from said spurious electrical effects.

2. Apparatus as in claim 1 wherein said balanced conductive and filtering means comprises a pair of similar connections, each between one of said outer primary winding terminals and a corresponding one of said fixed contact points, each said connection including series-connected inductive elements shunted by respective capacitive elements, the electrical center of said inductive and capacitive element arrangement being capacitively coupled to said movable contact; and said balanced conductive and filtering means also including a filtering means connected in series between said vibrator and said center tap.

ERNEST A. TUBBS.

REFERENCES CITED

The following references are of record in the file of this patent:

UNITED STATES PATENTS

| Number | Name | Date |
| --- | --- | --- |
| 1,557,229 | Zobel | Oct. 13, 1925 |
| 2,096,962 | Dressil | Oct. 26, 1937 |
| 2,141,369 | Alexander | Dec. 27, 1938 |
| 2,176,447 | Vilkomerson | Oct. 17, 1939 |
| 2,221,105 | Otto | Nov. 12, 1940 |
| 2,296,678 | Linder | Sept. 22, 1942 |
| 2,353,429 | Andrews | July 11, 1944 |

FOREIGN PATENTS

| Number | Country | Date |
| --- | --- | --- |
| 560,181 | Great Britain | Mar. 23, 1944 |